United States Patent
Kuraki et al.

(10) Patent No.: US 9,373,151 B2
(45) Date of Patent: Jun. 21, 2016

(54) IMAGE PROCESSING DEVICE AND IMAGE PROCESSING METHOD

(71) Applicant: FUJITSU LIMITED, Kawasaki-shi, Kanagawa (JP)

(72) Inventors: Kensuke Kuraki, Ichikawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/211,883

(22) Filed: Mar. 14, 2014

(65) Prior Publication Data

US 2014/0375692 A1      Dec. 25, 2014

(30) Foreign Application Priority Data

Jun. 19, 2013    (JP) .................................. 2013-129040

(51) Int. Cl.
*G06T 5/50*    (2006.01)
*G06T 1/00*    (2006.01)

(52) U.S. Cl.
CPC ....... *G06T 1/0028* (2013.01); *G06T 2201/0051* (2013.01); *H04N 2201/3273* (2013.01)

(58) Field of Classification Search
CPC .................... G06T 2201/0051; G06T 1/0021; G06T 2201/0052; G06T 2201/0061; G06T 1/005; G06T 1/0028; G06T 1/0064; G06T 1/0085; G06T 2201/0083; G06T 1/0035; G06T 2201/0202; G06T 1/0071; G06T 2201/0065; G06T 2201/0053; G06T 1/0057
See application file for complete search history.

(56) References Cited

U.S. PATENT DOCUMENTS

| | | |
|---|---|---|
| 2003/0035001 A1 | 2/2003 | Van Geest et al. |
| 2004/0057601 A1 | 3/2004 | Honda |
| 2004/0117629 A1 | 6/2004 | Koto et al. |
| 2007/0003104 A1* | 1/2007 | Moroo ................. G06T 1/0028 382/100 |
| 2008/0089552 A1 | 4/2008 | Nakamura et al. |
| 2010/0118123 A1 | 5/2010 | Freedman et al. |
| 2010/0228632 A1* | 9/2010 | Rodriguez .............. G06F 3/011 705/14.66 |
| 2012/0163653 A1 | 6/2012 | Anan et al. |

FOREIGN PATENT DOCUMENTS

| | | |
|---|---|---|
| EP | 1739619 A1 | 1/2007 |
| JP | 2004-96476 | 3/2004 |
| JP | 2004-108980 | 4/2004 |
| JP | 2004-194236 | 7/2004 |
| JP | 2007-13737 | 1/2007 |
| JP | 4198054 | 12/2008 |

(Continued)

OTHER PUBLICATIONS

Oliveira et al., "Relief Texture Mapping", SIGGRAPH2000 Proceedings of the 27th annual conference on Computer graphics and interactive techniques, pp. 359-368.

Extended European Search Report mailed Apr. 7, 2015 in related European Application No. 14161076.6.

(Continued)

*Primary Examiner* — Todd Buttram
(74) *Attorney, Agent, or Firm* — Staas & Halsey LLP (57) ABSTRACT

An image processing device includes a processor; and a memory which stores a plurality of instructions, which when executed by the processor, cause the processor to execute, taking an image containing an imaging lens; and embedding information in a display image based on image information of an object contained in the image.

13 Claims, 7 Drawing Sheets

(56) References Cited

FOREIGN PATENT DOCUMENTS

| | | |
|---|---|---|
| JP | 2009-031337 | 2/2009 |
| JP | 2011-205485 | 10/2011 |
| JP | 2012-142741 | 7/2012 |

OTHER PUBLICATIONS

Manabu Hirakawa et al., "A Study on Digital Watermarking Usage in the Mobile Marketing Field: Cases in Japan", 2009 $2^{nd}$ International Symposium on Logistics and Industrial Informatics, Sep. 1, 2009, pp. 1-6, XP055178757.

* cited by examiner

| ID | COORDINATES | DISTANCE (mm) | ANGLE | EMBEDING OCCURRENCE REGION COORDINATES |
|---|---|---|---|---|
| 1 | (x1,y1) | (1000) | – | – |
| 2 | (x2,y2) | (3000) | θ5 (θ6) | (x3,0) |
| 3 | ⋮ | ⋮ | ⋮ | ⋮ |
| ⋮ | ⋮ | ⋮ | ⋮ | ⋮ |

FIG. 7

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2013-129040, filed on Jun. 19, 2013, the entire contents of which are incorporated herein by reference.

FIELD

The embodiments discussed herein are related to, for example, an image processing device, and an image processing method to control display information.

BACKGROUND

In order to download a specific content to a terminal that is owned by a user him/herself, the user sometimes accesses a device to record various contents, such as a personal computer (PC), a digital signage terminal, a KIOSK terminal, and a smartphone, via a communication network. In order to achieve such access, a user has to acquire connection information to specify the device to record a content intended to be downloaded over a communication network. The connection information is information, such as an Internet protocol (IP) address, a service set identifier (SSID), Bluetooth® ID, and a uniform resource locator (URL), for example.

With that, Japanese Laid-open Patent Publication No. 2011-205485, for example, discloses a technique to connect to one instrument from the other instrument, that is, to wirelessly connect a plurality of instruments to each other by converting, in the one instrument, connection information desired to connect to the one instrument including instrument information in addition to wireless connection information to an image signal for display on a display unit and by taking, in the other instrument, the image signal for restoration of the connection information. In addition, Japanese Laid-open Patent Publication No. 2004-194236, for example, discloses a technique to embed digital watermark information, such as an IP address, as the connection information in a display image. Application of this technique is able to send, for example, information displayed on a display of a PC to a mobile terminal without utilizing a special device other than a camera.

SUMMARY

In accordance with an aspect of the embodiments, an image processing device includes a processor; and a memory which stores a plurality of instructions, which when executed by the processor, cause the processor to execute, taking an image containing an imaging lens; and embedding information in a display image based on image information of an object contained in the image.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Keen studies by the present inventors have revealed the following problems in the technique to embed connection information in a display image. When imaging a display image, due to influence of an ambient illumination environment, a phenomenon in which a user and objects surrounding the user are background reflected on a display surface of a display unit (for example, a display of a laptop personal computer) occurs. In this case, because the background reflection is superimposed on the display image with the connection information embedded therein as a noise due to disturbance, it is revealed that detection of the connection information becomes difficult. Therefore, by reducing the influence of the background reflection, it is expected to enable detection of the connection information.

Descriptions are given below to embodiments of an image processing device, an image processing method, and an image processing program according to one embodiment based on the drawings. These embodiments do not limit embodiments of the disclosed technique.

First Embodiment

Figure 1:
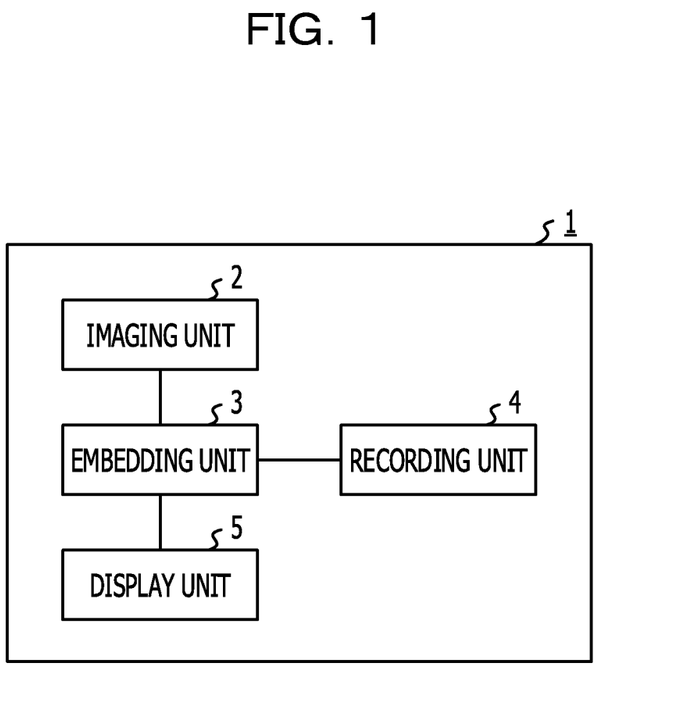
FIG. 1 is a functional block diagram of an image processing device according to a first embodiment.

FIG. 1 is a functional block diagram of an image processing device 1 according to a first embodiment. The image processing device 1 has an imaging unit 2, an embedding unit 3, a recording unit 4, and a display unit 5. The image processing device 1 may also be configured with an integrated circuit, such as an application specific integrated circuit (ASIC) and a field programmable gate array (FPGA), for example.

The imaging unit 2 is an imaging device, such as a charge coupled device (CCD) or complementary metal oxide semiconductor (CMOS) camera, for example. The imaging unit 2 images an image containing, for example, an imaging lens of a camera belonging to a mobile terminal carried by the user that images a display image displayed by the display unit 5 described later, for example. The imaging unit 2 is arranged, for example, in a mode of being built in the display unit 5 or in a mode of being attached externally. The imaging unit 2 does not have to be included in the image processing device 1 in all cases. For example, it is also possible to equip the imaging unit 2 in an external device other than the image processing device 1 via a communication line using a communication unit, not illustrated, that is equipped in the image processing device 1. Further, the imaging unit 2 may also be an imaging device including two or more cameras, such as a stereo camera. The imaging unit 2 outputs the caught image to the embedding unit 3.

The embedding unit 3 is, for example, a hardware circuit by wired logic. The embedding unit 3 may also be a functional module that is achieved by a computer program executed in the image processing device 1. The embedding unit 3 accepts the image from the imaging unit 2. The embedding unit 3 converts connection information (may also be referred to simply as information), such as an IP address and a service set identifier (SSID), that is desired by a mobile terminal carried by the user to, for example, an image signal to embed in a display image to be displayed by the display unit 5 based on image information of an object contained in the image. The image information of the object may be, for example, a luminance value (may also be referred to as a first pixel value) in the RGB color space.

The embedding unit 3 may utilize a technique in the past, such as a watermark technique disclosed in Japanese Laid-open Patent Publication No. 2012-142741, for example, as a method of converting connection information to an image signal and a method of embedding in a display screen. The embedding unit 3 may embed an image signal using alpha blending, for example, taking a pattern to change an area in the time direction as an image signal. Here, the image signal is, for example, a periodic signal, such as a sine wave and a triangular wave containing binary information in which one represents a value of "0" and the other represents a value of "1", and the embedding unit 3 may embed, for example, an image signal to be connection information by phase modulation in a display image.

The display image is an image of an arbitrary content, such as an image, a still image, or a document contained in moving image data, for example, and is recorded in the recording unit 4 described later, for example. The embedding unit 3 may obtain a display image by accessing the recording unit 4. The embedding unit 3 may also capture an image displayed by the display unit 5 described later using, for example, functions of an operation system (OS) that is mountable in the image processing device 1 as a display image. The embedding unit 3 may obtain a display image of a still image by utilizing an application programming interface (API) of the OS and the like, for example. Further, in a case that there is any alteration in the image displayed by the display unit 5, the embedding unit 3 may obtain a notification from the OS to obtain a screenshot of the display image taking the obtainment of the notification as an opportunity, and may also obtain a screenshot of the display image at regular intervals, such as once per second. In a case that the display unit 5 displays moving image data and the like, the embedding unit 3 may also obtain a screenshot of the display image in conformity with a frame rate of the moving image data. The embedding unit 3 may obtain a screenshot of the display image per 1/30 second in a case that, for example, a frame rate of the moving image data is 30 fps.

The recording unit 4 is, for example, a semiconductor memory element, such as a flash memory, or a recording device, such as a hard disk drive (HDD), a flash solid state drive (SSD), and an optical disk. The recording unit 4 is not limited to the recording device of the types mentioned above, and may also be a random access memory (RAM) and a read only memory (ROM). In the recording unit 4, a display image, which is an image contained in an arbitrary content, such as moving image data, a still image, or a document, for example, is recorded. The recording unit 4 does not have to be included in the image processing device 1 in all cases. For example, the display image may also be recorded in a cache, a memory, and the like, not illustrated, in each functional unit included in the image processing device 1. It is also possible to equip the recording unit 4 in an external device other than the image processing device 1 via a communication line using a communication unit, not illustrated, that is equipped in the image processing device 1.

Next, the embedding unit 3 controls an image signal with the converted connection information based on the first pixel value described above and, for example, a luminance value in the RGB color space (may also be referred to as a second pixel value) contained in the display image or an amount of change in the second pixel value per unit time to embed in the display image. Specifically, first of all, the embedding unit 3 generates a first synthesized image in which, for example, the image accepted from the imaging unit 2 is synthesized on a screenshot of a display image obtained from the recording unit 4.

Here, descriptions are given to technical significance to generate the first synthesized image. In the first embodiment, descriptions are given to, for example, a case that the imaging unit 2 is arranged near upper center or near lower center of the display unit 5 and also a case that the user carrying the mobile terminal having a lens to image a display image to be displayed by the display unit 5 is located approximately in front of the display unit 5. When the (display surface of the) display unit 5 is assumed to be a reflective surface of ambient illumination light and natural light, the first synthesized image in which an image caught by the imaging unit 2 and a display image to be displayed by the display unit 5 are synthesized may be regarded as a display image that is caught by an imaging lens of a mobile terminal carried by the user in which background reflection occurs actually. Based on the first synthesized image, an image signal with the converted connection information is controlled so as to suppress the influence of the background reflection, thereby enabling to accurately detect connection information.

In the generation of the first synthesized image, a ratio of synthesizing the image caught by the imaging unit 2 and the display image depends on the reflectivity of a material used for the (display surface of the) display unit 5, so that the embedding unit 3 may also preset an appropriate ratio by initial evaluation. For example, the ratio of the image caught by the imaging unit 2 (may also be referred to as an estimated background reflection image) may be set high in a case of high reflectivity, and the ratio of the display image may be set high in a case of low reflectivity.

The embedding unit 3 generates the first synthesized image in the alpha blending method expressed by, for example, the following expression from the image accepted from the imaging unit 2 and the display image.

$$Z=(1-\alpha)X+\alpha Y \quad (1)$$

In the above expression 1, X is the screenshot of the display image of the display unit 5, Y is the image that is caught by the imaging unit 2 (estimated background reflection image), Z is the first synthesized image in which the two images are synthesized, and α is the ratio of synthesis and is an arbitrary value in a range from 0 to 1. A greater α value causes a greater ratio of Y, so that the value of α may be set greater as, for example, the (display surface of the) display unit 5 has greater reflectance. The specific numerical value to be set in α may be, for example, held in a cache or a memory, not illustrated, of the embedding unit 3 by creating a conversion table in which the reflectance is associated with the α value by initial evaluation.

Figure 2A:
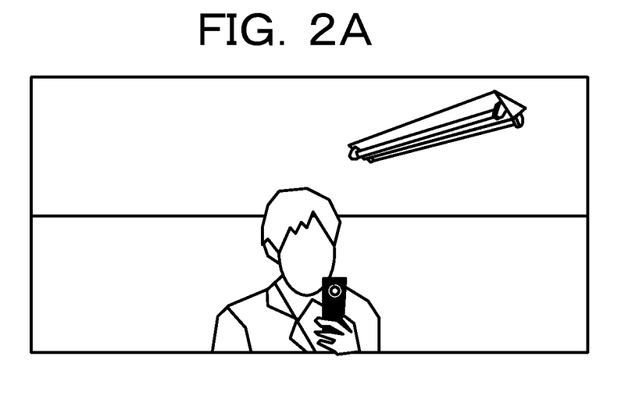
FIG. 2A is a conceptual diagram of an image that is background reflected on a display unit.
Figure 2B:
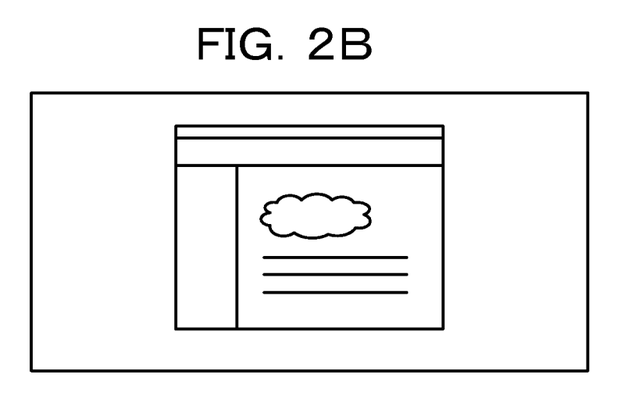
FIG. 2B is a conceptual diagram of a display image that is displayed by the display unit.
Figure 2C:
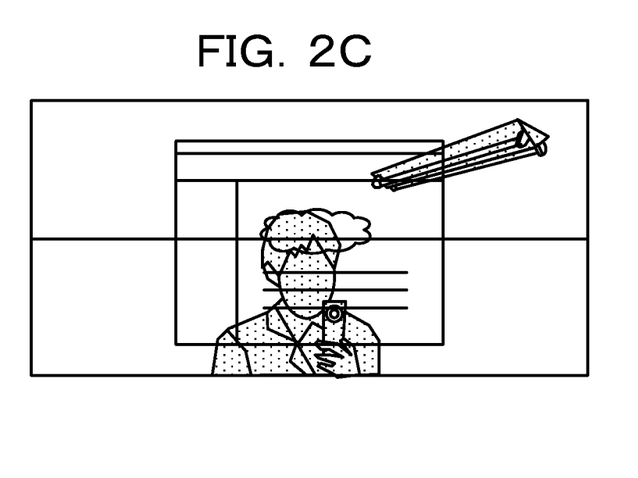
FIG. 2C is a conceptual diagram of a first synthesized image.

FIG. 2A is a conceptual diagram of an image that is background reflected on the display unit 5. FIG. 2B is a conceptual diagram of a display image that is displayed by the display unit 5. FIG. 2C is a conceptual diagram of the first synthesized image. As illustrated in FIGS. 2A through 2C, the first synthesized image is generated based on an image that is caught by the imaging unit 2 (estimated background reflection image) and a screenshot of a display image of the display unit 5.

Next, as control (shift) of the image signal to be embedded in the first synthesized image, the embedding unit 3 controls, for example, signal intensity. As a control method, the embedding unit 3 may apply a method of embedding signal intensity high in a contour region and in a complex texture region with many edges of the first synthesized image and embedding signal intensity low in a relatively smooth region like a background color. A method of adjusting the signal intensity may be performed by adjusting, for example, amplitude. Specifically, in a case that a display image is contained in moving image data, the embedding unit 3 calculates, for example, average values of luminance and color difference of the entire display screen and analyzes an average frequency in the time direction, and since it is difficult to be visually recognized by the user even with high signal intensity in a high frequency region, in other words, in a region of rapid motion and the like, it is possible to embed by controlling signal intensity high. In contrast, in a low frequency region, in other words, in a region of small motion, high signal intensity is prone to be visually recognized by the user, so that embedding is carried out by controlling the signal intensity as low as possible. Further, in order to control the image signal with the converted connection information, the embedding unit 3 may appropriately use a threshold (may also be referred to as a first threshold or a second threshold) as desired. As the first threshold, the luminance value may be set as 125. As the second threshold, the frequency may be set as 125 Hz. The embedding unit 3 may also control the signal intensity in accordance with the luminance value of the first synthesized image without using the threshold (for example, using proportional relationship).

The embedding unit 3 is may also apply, as disclosed in Japanese Patent No. 4260781, for example, a method of controlling signal intensity, by determining whether or not an arbitrary region has a specific color component, based on a determination result. Regarding the specific color component, a test pattern, such as a color bar, or the like is displayed on the display unit 5 as initial evaluation, and then an image signal with the converted connection information is superimposed to create a table having a color component that is easily visible by subjective evaluation as the specific color component, which may be held in a cache or a memory, not illustrated, of the embedding unit 3. The embedding unit 3 refers to the table and controls (shifts) the signal intensity highly in a region of, for example, a color component closer to the specific color component (for example, white close to the color component of illumination light by a fluorescent lamp). Further, the embedding unit 3 may also perform, as a method of controlling an image signal with converted connection information, for example, control to embed an image signal in a region other than the region of the first synthesized image that becomes at the above threshold or more.

Next, the embedding unit 3 embeds the controlled image signal by superposition on the display image displayed by the display unit 5 according to the following expression.

$$X' = X + \alpha W \quad (2)$$

In the described expression 2, X is the screenshot of the display image on the display unit 5, W is the controlled image signal, X' is the display image displayed by the display unit 5 (an image that is caught by the mobile terminal having an imaging lens), and α is, similar to the above expression 1, the ratio of synthesis and is an arbitrary value in a range from 0 to 1.

Here, descriptions are given to technical significance of embedding process in the embedding unit 3. In a case that the display screen in which background reflection occurs is caught from a position of the imaging lens of the mobile terminal carried by the user, imaging is carried out as a video in which a display image contained in the original content and the background reflection are synthesized. Therefore, the display image displayed by the display unit 5 becomes difficult to be visually recognized due to the influence of the background reflection, and this signifies that the signal intensity of the embedded image signal that is embedded in the display screen becomes low together as well. Therefore, even when the signal intensity is made higher than a case in which background reflection does not occur, the image signal with the converted connection information becomes difficult to be visually recognized by eyes of the user.

According to the embedding process to the first synthesized image in the embedding unit 3, the image signal with the converted connection information is controlled by considering not only details of the content but also the influence of the background reflection, so that it becomes possible to suppress a decrease in detection precision of the connection information by the mobile terminal having a lens that images the display image.

The embedding unit 3 may also generate the first synthesized image based on positional relationship of the imaging unit 2 and the display unit 5, in other words, a first distance and a first angle between the imaging unit 2 and an arbitrary reference point of the display unit 5. For example, in a case that the imaging unit 2 is arranged near upper center or near lower center of the display unit 5, the image caught by the imaging unit 2 and the image background reflected on the display unit 5 become approximately identical, so that special control is not desired, while in a case that the imaging unit 2 and the display unit 5 are arranged apart, based on the first distance and the first angle, the first synthesized image may be generated by appropriately correcting the positional relationship. The first distance and the first angle may be defined in advance and carried in a cache or a memory, not illustrated, of the embedding unit 3. The embedding unit 3 outputs the display image obtained by controlling the image signal with the converted connection information to the display unit 5.

The display unit 5 is a display device, such as a liquid crystal display or an organic electroluminescent display, for example. The display unit 5 may also be a display device, such as a projector, for example. Further, the display unit 5 may also be formed integrally with the imaging unit 2 and may also be formed separately from the imaging unit 2. The display unit 5 accepts the display image with the controlled connection information from the embedding unit 3 and displays the display image. The display unit 5 does not have to be included in the image processing device 1 in all cases. For example, it is also possible to equip the display unit 5 in an external device other than the image processing device 1 via a communication line using a communication unit, not illustrated, that is equipped in the image processing device 1.

Figure 3:
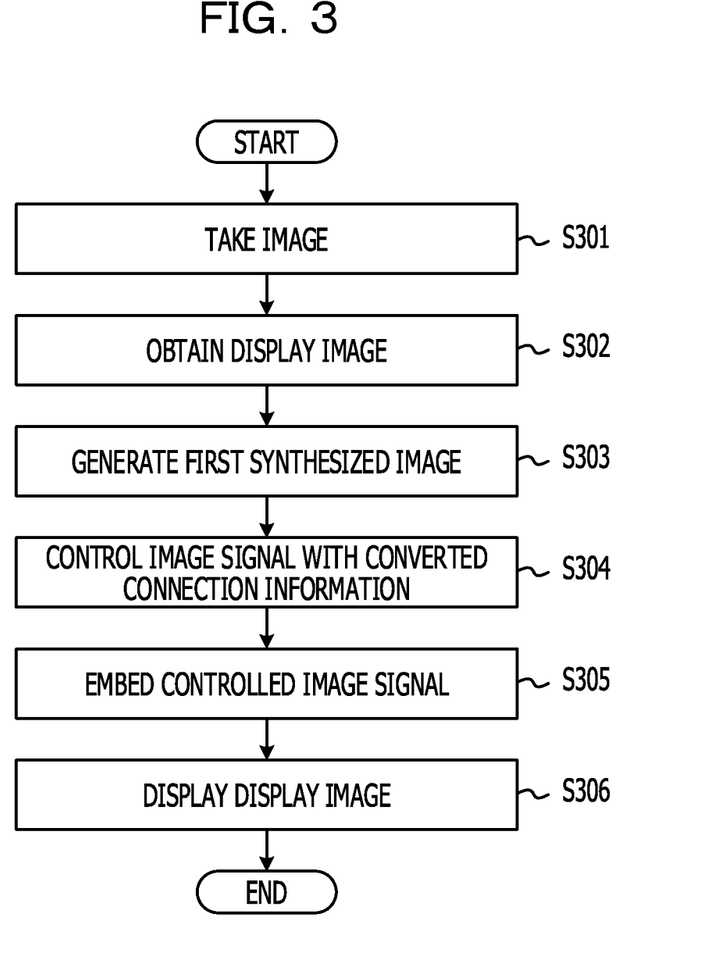
FIG. 3 is a flowchart of an image processing method with an image processing device.

FIG. 3 is a flowchart of an image processing method with the image processing device 1. The imaging unit 2 images an image containing, for example, an imaging lens of a camera belonging to a mobile terminal carried by a user that, for example, images a display image to be displayed by the display unit 5 (step S301). The imaging unit 2 outputs the caught image to the embedding unit 3.

The embedding unit 3 accepts the image from the imaging unit 2. The embedding unit 3 also obtains the display image by accessing the recording unit 4 (step S302). Next, the embedding unit 3 generates a first synthesized image using the above method from the image accepted from the imaging unit 2 (step S303).

The embedding unit 3 controls an image signal with converted connection information to be embedded in the first synthesized image (step S304). As one example of the control method, as described above, it is possible to apply a method of embedding signal intensity high in a contour region and in a complex texture region with many edges of the first synthesized image and embedding signal intensity low in a relatively smooth region like a background color.

The embedding unit 3 embeds the controlled image signal by superposition on the display image displayed by the display unit 5 according to, for example, the above expression 2 (step S305). The embedding unit 3 outputs the display image obtained by controlling the image signal with the converted connection information to the display unit 5.

The display unit 5 accepts the display image with the controlled image signal from the embedding unit 3 to display the display image (step S306), thereby the image processing device 1 completing the process illustrated in FIG. 3. In a case that the imaging unit 2 continues to catch an image, the image processing device 1 may also repeatedly execute the process disclosed in step S301 through step S306.

According to the image processing device in the first embodiment, it is possible to reduce the influence of a noise due to disturbance. Specifically, utilizing an image taken by the imaging unit 2, background reflection occurs (on the display surface) in the display unit 5 is estimated, and utilizing the estimated image and the display image displayed by the display unit 5, the image signal of the connection information is controlled. This improves the detection precision of the connection information that becomes difficult to be detected due to the various influence of the background reflection by, for example, illumination light, natural light, and the like.

Second Embodiment

In the first embodiment in a case that a user, for example, carrying a mobile terminal having a lens that images a display image is located approximately in front of the display unit 5, a higher effect is yielded. In the second embodiment, descriptions are given to a case that the user is located other than approximately in front of the display unit 5, for example, diagonally in front. In the second embodiment, in order to estimate a background reflection image on the display unit 5 in the viewpoint of the lens that images a display image, process to estimate positional relationship of objects, such as a position of an imaging lens that is mounted in a mobile terminal carried by the user, a position of the display unit 5, and a fluorescent lamp to be a source of generation of illumination light, is performed. Technical significance of the process is as follows. The position of, for example, a fluorescent lamp contained in the image that is caught by the imaging unit 2 becomes regular all the time unless the position or the range of imaging by the imaging unit 2 is changed. In contrast, the image that is background reflected on the display unit 5 in the viewpoint of the imaging lens that images a display image changes depending on the position of the imaging lens. This is because background reflection occurs in a region where an incident angle of illumination light of the fluorescent lamp to the display unit 5 becomes equal to a reflection angle from the display unit 5 to the imaging lens. Therefore, there is a demand for the process to estimate positional relationship of objects, such as a position of the imaging lens, a position of the display unit 5, and a fluorescent lamp to be a source of generation of illumination light and the like. Detailed descriptions are given below to embodiments of an image processing device, an image processing method, and an image processing program in the second embodiment including the process based on the drawings. It is to be noted that these embodiments do not limit embodiments of the disclosed technique.

Figure 4:
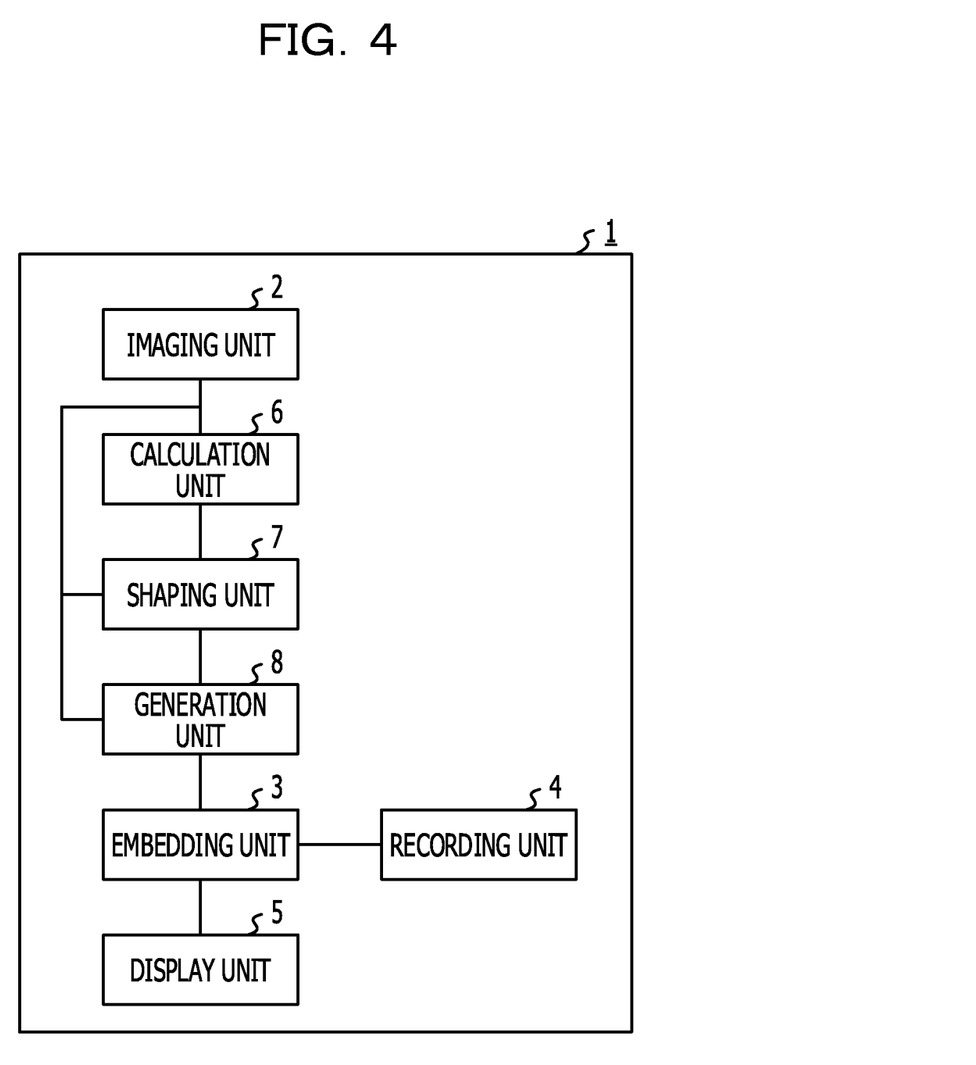
FIG. 4 is a functional block diagram of an image processing device according to a second embodiment.

FIG. 4 is a functional block diagram of an image processing device 1 according to the second embodiment. The image processing device 1 has an imaging unit 2, an embedding unit 3, a recording unit 4, a display unit 5, a calculation unit 6, a shaping unit 7, and a generation unit 8. The image processing device 1 may also be configured with an integrated circuit, such as an application specific integrated circuit (ASIC) and a field programmable gate array (FPGA), for example.

Since the function of the imaging unit 2 at least has a function similar to the first embodiment, detailed descriptions are omitted. The imaging unit 2 outputs a caught image to the calculation unit 6, the shaping unit 7, and the generation unit 8. The calculation unit 6 is, for example, a hardware circuit by wired logic. The calculation unit 6 may also be a functional module that is achieved by a computer program executed in the image processing device 1. The calculation unit 6 accepts the image from the imaging unit 2. The calculation unit 6 calculates a second angle between an object contained in the image and an arbitrary reference point of the display unit 5. The object contained in the image is an object that is referred to using, for example, noun, such as a fluorescent lamp, an air conditioner, and a clock. The arbitrary reference point of the display unit 5 may be set, for example, near upper center of the display unit 5 and may also be set in another arbitrary reference point. Further, the calculation unit 6 calculates a third angle between the reference point of the display unit 5 contained in the image and the imaging lens contained in the image. A method of specifying the imaging lens contained in the image allows specification of the imaging lens by holding an image containing an imaging lens in advance to use template matching.

Next, the calculation unit 6 further calculates a second distance between the reference point of the display unit 5 and the object contained in the image. In order to calculate the second distance, the calculation unit 6 may use, for example, a ranging sensor, not illustrated, that the calculation unit 6 is able to contain. The calculation unit 6 may calculate the second distance based on detection information of the ranging sensor in, for example, a TOF format to measure a depth from a round trip time of a laser beam, a pattern radiation format to measure distortion in a pattern of light when radiated to a laser beam in a specific pattern, and the like. Further, the calculation unit 6 may calculate the second distance using, for example, a method described in U.S. Patent Application Publication No. 2010/0118123 A1.

In calculation of the second distance, in a case that the imaging unit 2 is an imaging device including two or more cameras, such as a stereo camera, the calculation unit 6 does not have to include a ranging sensor. The calculation unit 6 may calculate the second distance by the triangulation principle based on, for example, parallax between a plurality of images caught by the stereo camera. The calculation unit 6 may also calculate the second distance using, for example, a method described in Japanese Patent No. 4155780 or Japanese Patent No. 4198054. The calculation unit 6 outputs the second distance, the second angle, and the third angle thus calculated to the shaping unit 7.

The shaping unit 7 is, for example, a hardware circuit by wired logic. The shaping unit 7 may also be a functional module that is achieved by a computer program executed in the image processing device 1. The shaping unit 7 accepts the second distance, the second angle, and the third angle from the calculation unit 6 and accepts the image from the imaging unit 2. The shaping unit 7 shapes a depth map of an object in the viewpoint of the imaging lens contained in the image that is caught by the imaging unit 2 based on the second distance, the second angle, and the third angle using various approaches in the past. In a case that the imaging unit 2 is an imaging device including two or more cameras, such as a stereo camera, an image obtained by averaging the plurality of images that are caught by the stereo camera, for example, may be used. The shaping unit 7 outputs the depth map thus shaped to the generation unit 8.

Figure 5:
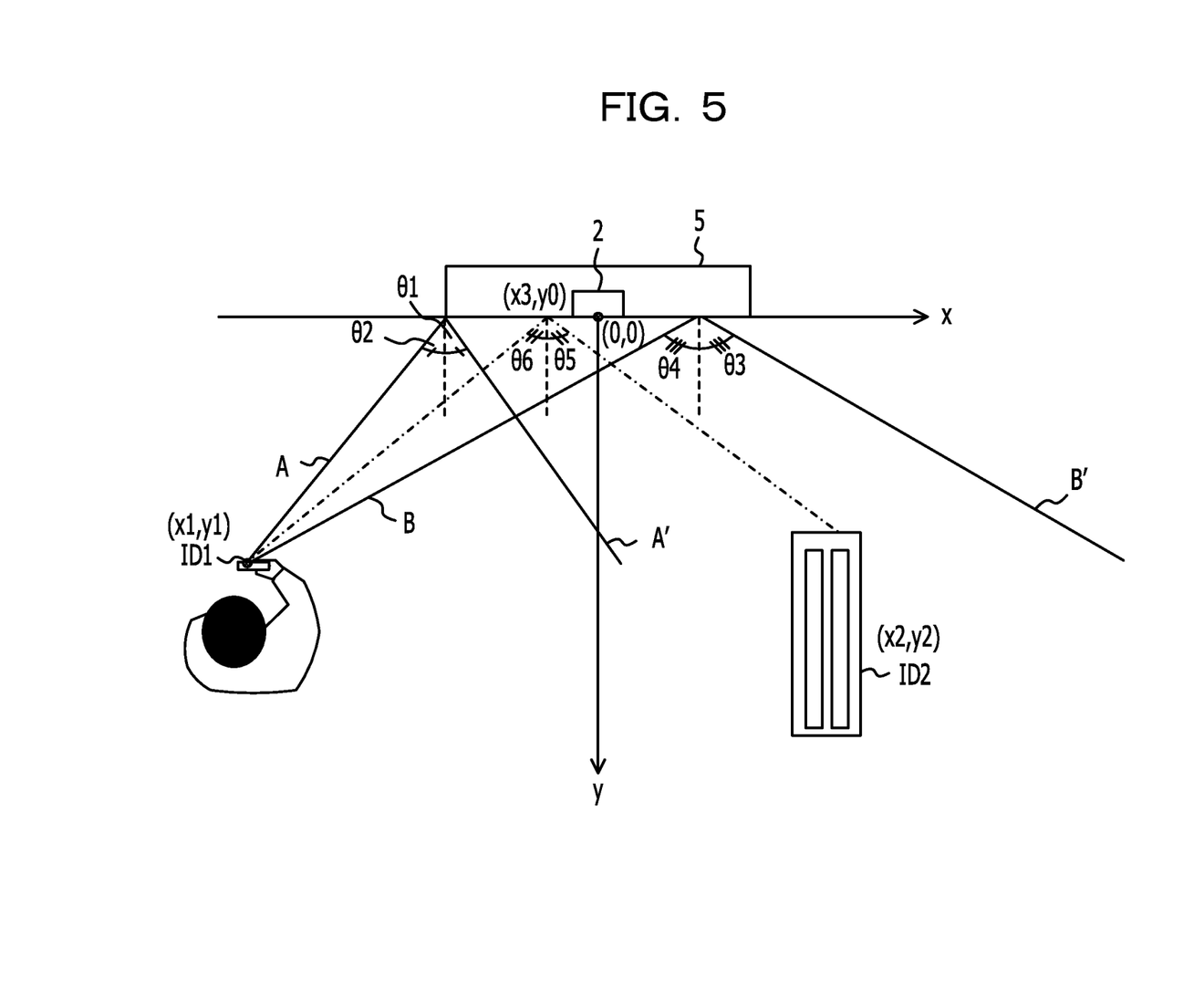
FIG. 5 is a conceptual diagram of positional relationship of an imaging unit, a display unit, an imaging lens, and an object.

FIG. 5 is a conceptual diagram of positional relationship of the imaging unit 2, the display unit 5, the imaging lens, and the object. In FIG. 5, for example, the origin of coordinates is set at the center of the imaging unit 2 that is arranged near upper center of the display unit 5. In FIG. 5, although not having to be given in all cases, an ID is given for convenience of description in the second embodiment. An ID1 is an imaging lens belonging to a mobile terminal carried by the user, and an ID2 is fluorescent lamps to be one example of the object. Although other objects are contained in the image, descriptions are given using the fluorescent lamps only for convenience of description. It is possible to appropriately calculate coordinates of the ID1 and the ID2 using, for example, the second distance, the second angle, and the third angle to become, for example, (x1, y1), (x2, y2). Here, objects in a range surrounded by a line segment A' and a line segment B' that are obtained by reflecting a line segment A and a line segment B that join the imaging lens to both ends of the display unit 5 at angles θ2 (=θ1) and θ4 (=θ3) may be estimated to background reflect on the image that is caught by the imaging lens, so that the generation unit 8 generates a depth map in the range. In addition, by appropriately calculating an incident angle (reflection angle) of the ID2 to the ID1 taking the display unit 5 as a reflective surface, the coordinates (x3, y0) in which the illumination light is background reflected to the display unit 5 may be calculated.

Figure 6:
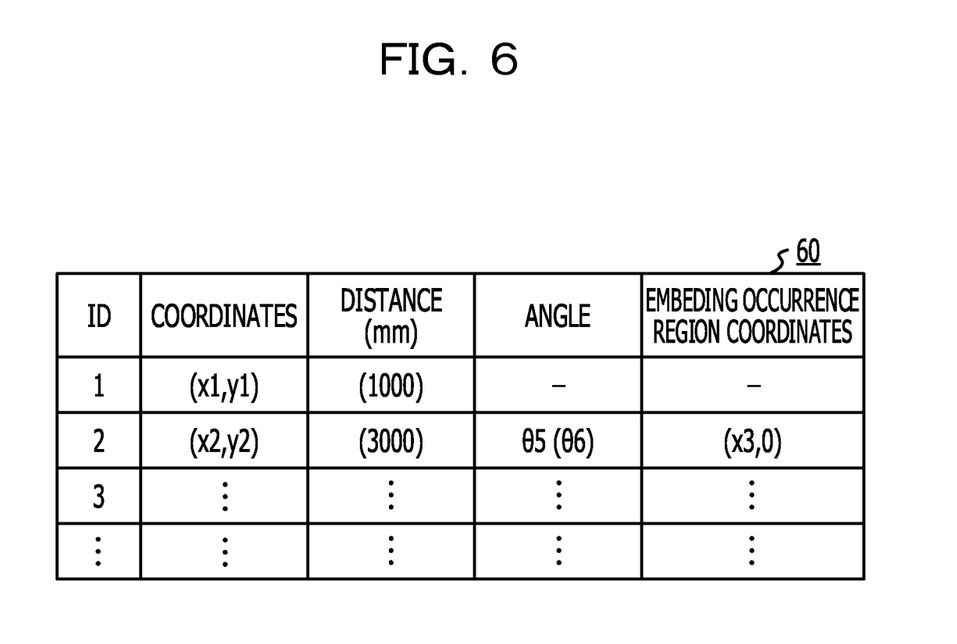
FIG. 6 is one example of a table containing data generated by a shaping unit.

FIG. 6 is one example of a table including data generated by the shaping unit 7. As illustrated in a table 60 in FIG. 6, in the table 60, an ID of an object, coordinates corresponding to the ID, a distance from the origin of coordinates illustrated in FIG. 5, an angle made by the object to the imaging lens (incident angle=reflection angle) in a case that the display unit 5 is the reflective surface, and coordinates of a region in which background reflection of the display unit 5 occurs that is calculated from the angle are stored as desired.

The generation unit 8 in FIG. 4 is, for example, a hardware circuit by wired logic. The generation unit 8 may also be a functional module that is achieved by a computer program executed in the image processing device 1. The generation unit 8 accepts the depth map from the shaping unit 7 and accepts the image from the imaging unit 2. The generation unit 8 rotates the depth map based on the third angle, and then generates a superimposed image in which a first pixel described above is superimposed. Specifically, the generation unit 8 rotates the depth map accepted from the shaping unit 7 based on the second distance, the second angle, or the third angle, and then pastes the image accepted from the imaging unit 2 using, for example, a relief texture mapping approach taking the first pixel value described above as a texture. The generation unit 8 may use a method of relief texture mapping, for example, disclosed in "Manuel M. Oliveria, Gary Bishop, David McAllister, "Relief texture mapping", SIGGRAPH2000 Proceedings of the 27th annual conference on Computer graphics and interactive techniques, 359-368, 2000". The generation unit 8 generates a superimposed image (may also be referred to as a 3D object) by using the method. It also becomes possible to generate a superimposed image with small occlusion and of higher resolution by increasing a number of cameras in the imaging unit 2. The generation unit 8 outputs the superimposed image thus generated to the embedding unit 3.

The embedding unit 3 is, for example, a hardware circuit by wired logic similar to the first embodiment. The embedding unit 3 may also be a functional module that is achieved by a computer program executed in the image processing device 1. The embedding unit 3 accepts the superimposed image from the generation unit 8. The embedding unit 3 generates a second synthesized image in which the superimposed image is synthesized on a screenshot of a display image.

Next, the embedding unit 3 controls an image signal with converted connection information in a region where the first pixel value, the second pixel value, or an amount of change in the second pixel value of the second synthesized image becomes a predetermined first threshold or more. Regarding the control method, it is possible to carry out process similar to the process to the first synthesized image disclosed in the first embodiment. The embedding unit 3 outputs the display image obtained by controlling the image signal to the display unit 5.

Since the function of the display unit 5 at least has a function similar to the first embodiment, detailed descriptions are omitted. The display unit 5 accepts the display image with the controlled connection information from the embedding unit 3 to display the display image.

According to the image processing device in the second embodiment, it is possible to reduce the influence of a noise due to disturbance. Specifically, background reflection occurring (on the display surface) in the display unit 5 is estimated utilizing the image taken by the imaging unit 2 to control the image signal of the connection information utilizing the estimated image and the display image displayed by the display unit 5. This improves the detection precision of the connection information that becomes difficult to be detected by the various influence of the background reflection due to, for example, illumination light, natural light, and the like. Further, a background reflection image on the display unit 5 is estimated in the viewpoint of the lens that images the display image, so that it is possible to estimate background reflection with very high precision. Although the second distance is calculated in the second embodiment, the second distance does not have to be calculated in all cases. For example, the image processing device 1 may also estimate a rough background reflection image on the display unit 5 in the viewpoint of the lens that images the display image only using the second angle and the third angle.

Third Embodiment

Descriptions are given to overall process including connection process of an information processing terminal, not illustrated, that mounts or connects an image processing device 1 and a mobile terminal having an imaging lens carried by a user. To begin with, a display unit 5 displays a display image with connection information, for example, that is disclosed in the first embodiment or the second embodiment embedded therein. Next, the user carrying the mobile terminal having the imaging lens images a display image with connection information embedded therein to be displayed by the display unit 5. The mobile terminal is connected to the information processing terminal via a network based on the connection information. In the connection process, the mobile terminal may also send an image caught by the imaging lens of the mobile terminal to an arbitrary server, and the server that receives the image may decode the connection information from the image for sending to the mobile terminal. The information processing terminal and the mobile terminal that have completed the connection process carry out sending and receiving of, for example, various contents (moving images, still images, document data, and the like) belonging to the information processing terminal via a network.

Fourth Embodiment

Figure 7:
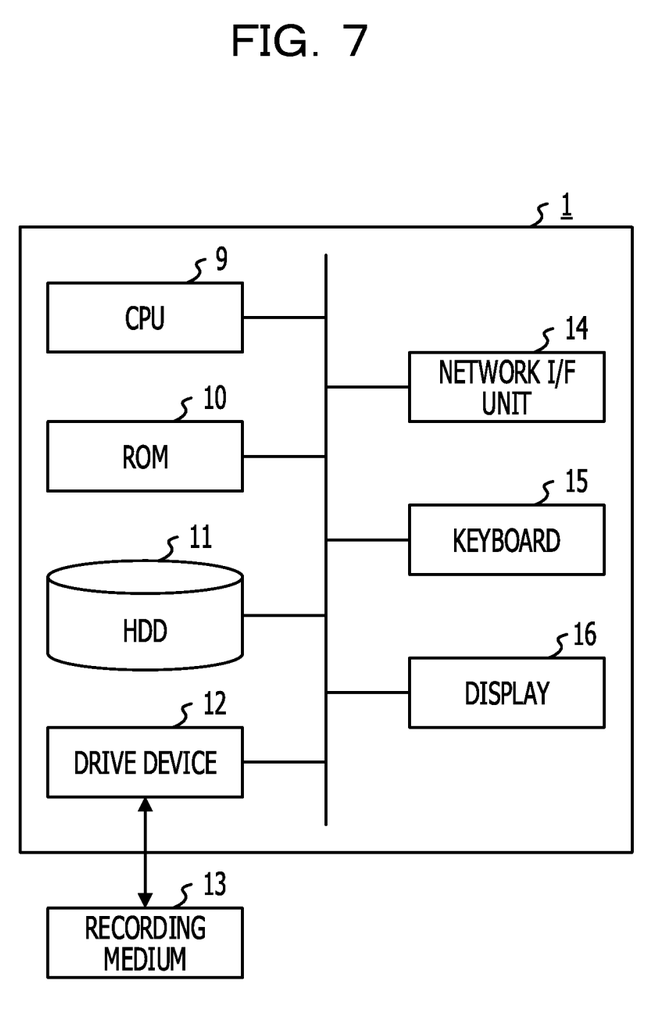
FIG. 7 is a hardware configuration diagram of a computer that functions as an image processing device according to one embodiment.

FIG. 7 is a hardware configuration diagram of a computer that functions as an image processing device 1 according to one embodiment. As illustrated in FIG. 7, the image processing device 1 includes a CPU 9, a ROM 10, an HDD 11, a drive device 12, a network I/F unit 14, a keyboard 15, and a display 16. Each of these components is connected to each other via a bus to allow data input/output.

The CPU 9 is an arithmetic device to carry out control of each device, and arithmetic operation and processing of data in a computer. The CPU 9 is also an arithmetic device to execute a program recorded in the ROM 10 and the HDD 11, and accepts data from the keyboard 15 and a recording device for arithmetic operation and processing and then outputs the data to the display 16, a recording device, and the like.

The ROM 10 is a read-only memory and is a recording device to record or temporarily store a program, such as an OS, which is basic software executed by the CPU 9, and application software, and data. It is also possible to apply a RAM instead of the ROM.

The HDD 11 is a recording device to record data related with application software and the like.

The drive device 12 reads a program out of a recording medium 13, for example, a flexible disk for installation in the HDD 11.

A predetermined program is stored in the recording medium 13, and the program stored in the recording medium 13 is installed in the image processing device 1 via the drive device 12. The installed predetermined program becomes available to be executed by the image processing device 1.

The network I/F unit 14 is an interface between the image processing device 1 and a peripheral instrument having a communication function connected via a network, such as a local area network (LAN) and a wide area network (WAN), that is constructed by a data transmission channel, such as a wired and/or wireless line.

The keyboard 15 is an input instrument provided with a cursor key, numeric input and various functional keys, and the like. It is also possible to apply a mouse, a slicepad, and the like to carry out selection of a key and the like on the display screen of the display 16 instead of a keyboard as an input instrument. The keyboard 15 is a user interface for a user to give an operation instruction and to input data to the CPU 9.

Since the function of the display 16 at least has a function similar to the display unit 5 disclosed in the first embodiment or the second embodiment, detailed descriptions are omitted. Display in accordance with the display data inputted from the CPU 9 is carried out.

The image processing method described above may also be achieved as a program to be executed in a computer. The program is installed from a server or the like to be executed in a computer, thereby enabling to achieve the image processing method described above.

It is also possible to achieve the image processing describe above by recording the program in the recording medium 13 and causing a computer or a mobile terminal to read the recording medium 13 with the program recorded therein. For the recording medium 13, various types of recording medium may be used, such as a recording medium to optically, electrically, or magnetically record information, like a CD-ROM, a flexible disk, and a magnetooptical disk, and a semiconductor memory to electrically record information, like a ROM and a flash memory.

The components of each device illustrated above do not have to be physically configured as the illustration in all cases. That is, the specific mode of separation and integration in each device is not limited to the illustration, and all or part thereof may be configured by separating or integrating functionally or physically in an arbitrary unit in accordance with various types of load, status of use, and the like. In addition, the various types of process described in the above embodiments may be achieved by executing a program in a computer prepared in advance, such as a personal computer and a workstation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute,
    taking image of a display containing a reflected image including an object; and
    embedding information in a display image based on image information of the object contained in the reflected image, the embedding embeds the information based on a first pixel value contained in the image information, and a second pixel value contained in the display image or an amount of change in the second pixel value per unit time;
    calculating a first angle between a display unit that displays the display image and the object, and a second angle between the display unit and an imaging lens;
    calculating a distance between the display unit that displays the display image and the object;
    shaping a depth map of the object in a viewpoint of the imaging lens based on the distance and the second angle; and
    generating a superimposed image in which a first pixel value contained in a first synthesized image is superimposed on the depth map after shaping;
wherein the embedding embeds the information in the display image based on the image information of the object contained in the superimposed image;

wherein the embedding embeds the information in the display image based on the first angle and the second angle.

2. The device according to claim 1,
wherein the embedding generates the first synthesized image in which the image is synthesized on a screenshot of the display image and controls the information in a region where the first pixel value or a second pixel value contained in the first synthesized image becomes a predetermined first threshold or more or an amount of change in the second pixel value per unit time becomes a predetermined second threshold or more.

3. The device according to claim 2,
wherein the embedding carries out control to shift signal intensity of the information in the region, control to shift a signal color component of the information in the region, or control to embed the information in other than the region.

4. The device according to claim 1,
wherein the embedding embeds the information in the display image based on a second distance and a third angle between an imaging unit that takes the image and the display unit.

5. The device according to claim 1, further comprising:
causing a mobile terminal to recognize, by causing a mobile terminal having the imaging lens to image the information, connection information for connecting to the image processing device.

6. The device according to claim 1,
further comprising a stereo camera that takes the image, and
wherein the calculating calculates the distance based on parallax between a plurality of images that are caught by the stereo camera.

7. The device according to claim 1,
wherein the calculating calculates the distance based on detection information of a ranging sensor.

8. The device according to claim 1,
wherein the imaging takes the image containing the imaging lens that images the display image.

9. An image processing method comprising:
taking an image of a display containing a reflected image including an object; and embedding, by a computer processor, information in a display image based on image information of the object contained in the reflected image, the embedding embeds the information based on a first pixel value contained in the image information, and a second pixel value contained in the display image or an amount of change in the second pixel value per unit time;
calculating a distance between a display unit that displays the display image and the object;
calculating a first angle between the display unit and the object, and a second angle between the display unit and an imaging lens;
shaping a depth map of the object in a viewpoint of the imaging lens based on the distance and the second angle; and
generating a superimposed image in which a first pixel value contained in a first synthesized image is superimposed on the depth map after shaping;
wherein the embedding embeds the information in the display image based on the image information of the object contained in the superimposed image;
wherein the embedding embeds the information in the display image based on the first angle and the second angle.

10. The method according to claim 9,
wherein the embedding generates the first synthesized image in which the image is synthesized on a screenshot of the display image and
controls the information in a region where the first pixel value or a second pixel value contained in the first synthesized image becomes a predetermined first threshold or more or an amount of change in the second pixel value per unit time becomes a predetermined second threshold or more.

11. The method according to claim 10,
wherein the embedding carries out control to shift signal intensity of the information in the region, control to shift a signal color component of the information in the region, or control to embed the information in other than the region.

12. The method according to claim 9,
wherein the embedding embeds the information in the display image based on a second distance and a third angle between an imaging unit that takes the image and the display unit.

13. A non-transitory computer-readable storage medium storing an image processing program that causes a computer to execute a process comprising:
imaging an image of a display containing an object; and embedding information in a display image based on image information of the object contained in the reflected image, the embedding embeds the information based on a first pixel value contained in the image information, and a second pixel value contained in the display image or an amount of change in the second pixel value per unit time;
calculating a distance between a display unit that displays the display image and the object;
calculating a first angle between the display unit and the object, and a second angle between the display unit and an imaging lens;
shaping a depth map of the object in a viewpoint of the imaging lens based on the distance and the second angle; and
generating a superimposed image in which a first pixel value contained in a first synthesized image is superimposed on the depth map after shaping;
wherein the embedding embeds the information in the display image based on the image information of the object contained in the superimposed image;
wherein the embedding embeds the information in the display image based on the first angle and the second angle.

* * * * *